C. R. BRYANT.
PISTON RING.
APPLICATION FILED MAY 8, 1914.

1,264,771.

Patented Apr. 30, 1918.

Inventor
Clarance R. Bryant,

Witnesses
Frederick R. Moran,
D. W. Gould.

By Victor J. Evans,
Attorney

UNITED STATES PATENT OFFICE.

CLARANCE R. BRYANT, OF FORT WORTH, TEXAS, ASSIGNOR TO BROWNLOW BYRNS, OF CHICAGO, ILLINOIS.

PISTON-RING.

1,264,771. Specification of Letters Patent. Patented Apr. 30, 1918.

Application filed May 8, 1914. Serial No. 837,329.

*To all whom it may concern:*

Be it known that I, CLARANCE R. BRYANT, a citizen of the United States, residing at Fort Worth, in the county of Tarrant and State of Texas, have invented new and useful Improvements in Piston-Rings, of which the following is a specification.

The invention relates to an improvement in packing rings, and particularly to a sectional ring, made up of independent parts which may be readily assembled or separated.

The main object of the present invention is the provision of a packing ring including inner and outer rings each divided, with the inner ring formed to receive and sustain the outer ring.

The invention in the preferred form of details will be described in the following specification, reference being had particularly to the accompanying drawings, in which:—

Figure 1:
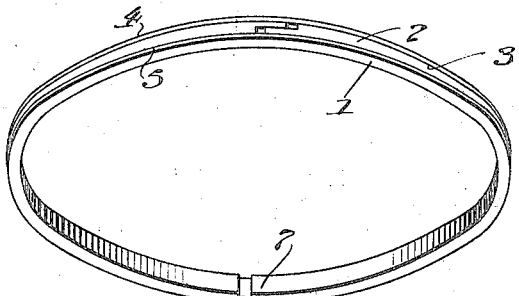
Figure 1 is a perspective view showing the improved ring complete.
Figure 2:
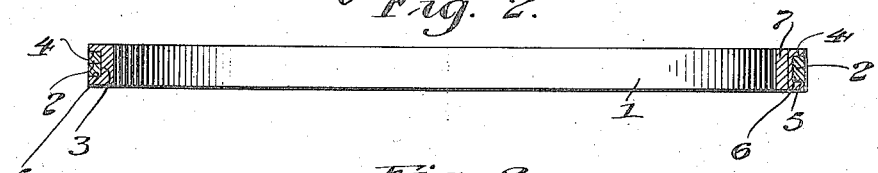
Fig. 2 is an enlarged transverse section of same.
Figure 3:
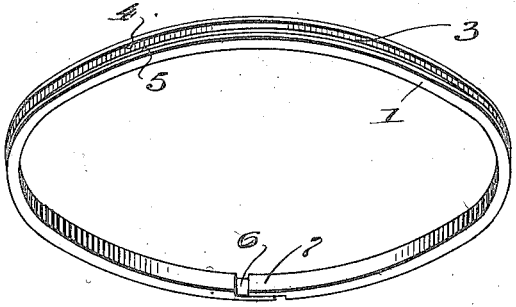
Fig. 3 is a perspective of the inner ring.
Figure 4:
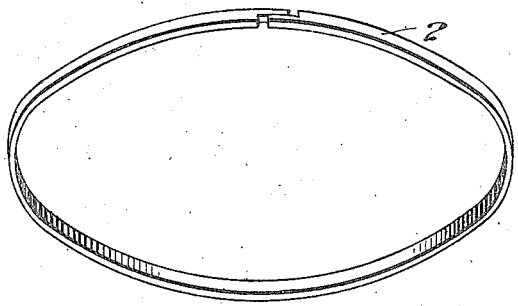
Fig. 4 is a perspective of the outer ring.

Referring particularly to the accompanying drawings, the improved packing ring comprises an inner ring 1 and an outer ring 2, both constructed of appropriate, preferably resilient, material.

The inner ring is constructed to form a channel 3 in its outer surface, the channel opening outwardly and having upper and lower edge walls 4 and 5 of approximately equal thickness. The ring as a whole is divided, the line of juncture being in parallelism with the axis of the ring. One of the meeting edges is formed with a tongue 6 having its inner surface coincident with the relatively inner edge of the ring and approximately one half the thickness of the similar dimension of the ring, the other meeting edge having corresponding reversely arranged tongue 7, so that when the ends are brought together as in operative use, an interlocking in effect is provided, as plainly seen from the drawings.

The outer ring 2 is of a size to fit within and fill the channel 3. This ring is also divided, and the meeting ends are formed with relatively offset projections adapted to interlock when the sections are brought together under compression to which they are to be subjected in operative use.

The joint between the meeting ends of the outer ring is disposed at right angles to the joint between the ends of the inner ring so that while the latter is divided throughout that dimension of the ring in parallelism to the axis thereof, the outer ring is divided on lines at right angles. This prevents any tortional strain from inducing simultaneous separation of the meeting ends of the respective ends, so that when both rings are in position one acts in effect as an interlock to the other.

What is claimed is:—

A packing ring including an inner and outer ring, the inner ring being formed with an exterior channel of a size to receive the outer ring, each of the rings being divided and formed at their meeting ends with interlocking projections, the projections of one ring interfitting on lines parallel to the axis of the ring, the projections of the other ring interfitting on lines at approximately right angles thereto.

In testimony whereof I affix my signature in presence of two witnesses.

CLARANCE R. BRYANT.

Witnesses:
W. R. FRANCIS,
W. C. KITCHEN.